(12) United States Patent
De Barros et al.

(10) Patent No.: US 7,835,603 B2
(45) Date of Patent: Nov. 16, 2010

(54) MODE CONVERTER

(75) Inventors: Carlos De Barros, Boulogne-Billancourt (FR); Lionel Provost, Dampart (FR); Pierre Sansonetti, Palaiseau (FR); Philippe Chanclou, Lannion (FR)

(73) Assignee: Alcatel Lucent, Paris (FR)

( * ) Notice: Subject to any disclaimer, the term of this patent is extended or adjusted under 35 U.S.C. 154(b) by 207 days.

(21) Appl. No.: 11/574,803

(22) PCT Filed: Aug. 4, 2005

(86) PCT No.: PCT/EP2005/053850

§ 371 (c)(1),
(2), (4) Date: May 23, 2008

(87) PCT Pub. No.: WO2006/027298

PCT Pub. Date: Mar. 16, 2006

(65) Prior Publication Data

US 2008/0267559 A1    Oct. 30, 2008

(30) Foreign Application Priority Data

Sep. 8, 2004    (FR) .................................. 04 51993

(51) Int. Cl.
*G02B 6/26* (2006.01)
(52) U.S. Cl. ............................................. 385/28
(58) Field of Classification Search .................. 385/28
See application file for complete search history.

(56) References Cited

U.S. PATENT DOCUMENTS

| | | | |
|---|---|---|---|
| 4,740,974 A * | 4/1988 | Byron | 372/3 |
| 2003/0165289 A1 | 9/2003 | De Barros et al. | |
| 2003/0202761 A1* | 10/2003 | Ruilier et al. | 385/123 |
| 2004/0037505 A1* | 2/2004 | Morin | 385/37 |

FOREIGN PATENT DOCUMENTS

WO    WO 99/49342    9/1999

OTHER PUBLICATIONS

P. Chanclou et al, "Deesign and performance of expanded mode fiber using microoptics" Journal of Lightwave Technology, IEEE USA, vol. 20, No. 5, May 5, 200, pp. 836-842, XP002321915.
Nguyen Hogn Ky et al, "Efficient broadband intracor grating $LP_{01}$-$LP_{02}$ mode converters for chromatic-dispersion compensation", Mar. 15, 1998, vol. 23, No. 6, Optics Letters, pp. 445,447, XP000753367.

* cited by examiner

*Primary Examiner*—Jerry T Rahll
(74) *Attorney, Agent, or Firm*—Harness, Dickey & Pierce, P.L.C.

(57) ABSTRACT

An in-fiber mode converter comprises fiber portions (10) constituting an input microlens, a fiber portion (20) constituting a phase shifting region adapted to convert a propagation mode of an optical signal into another propagation mode, and fiber portions (30) constituting an output microlens. The fiber portions are spliced, the converter is compact and losses are minimized relative to mode conversion in free space.

16 Claims, 2 Drawing Sheets

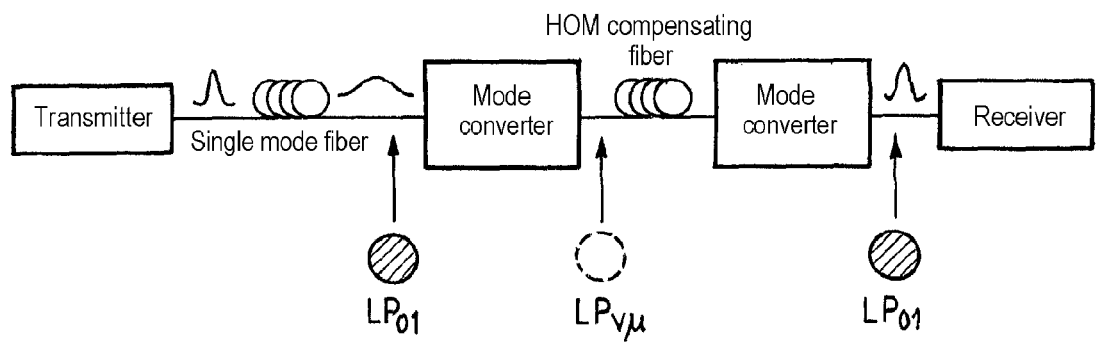
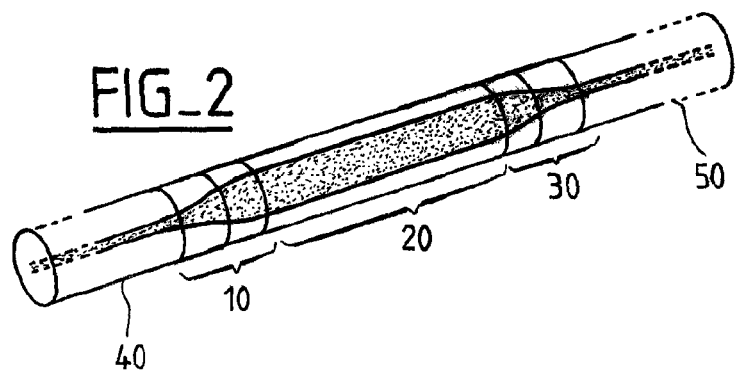
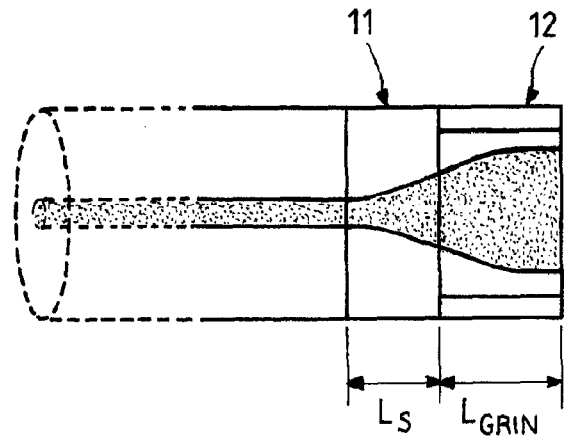

FIG_4
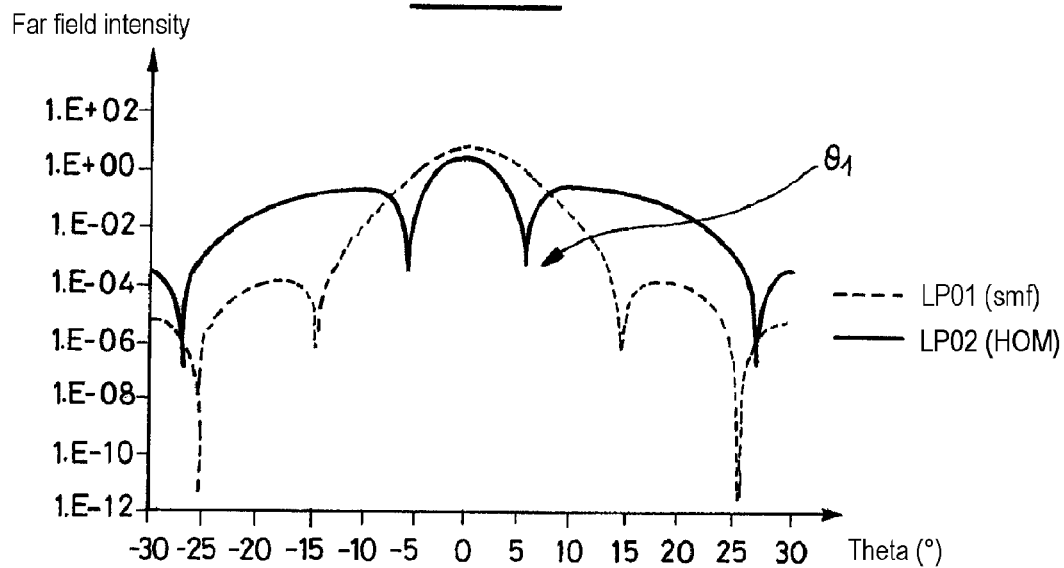
FIG_5
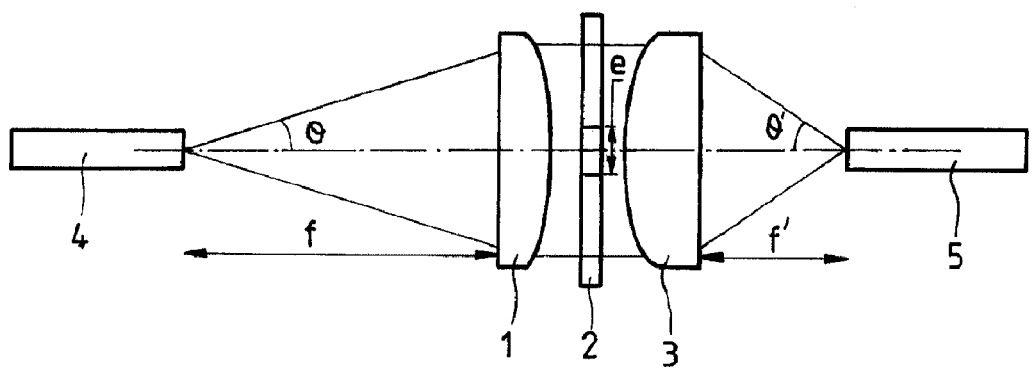
FIG_6
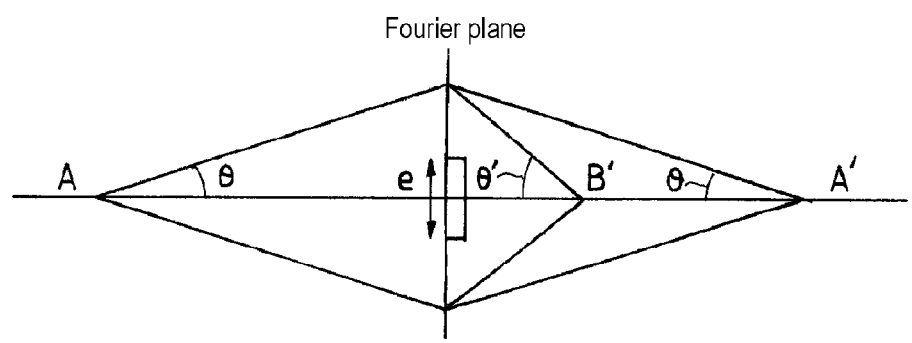

MODE CONVERTER

The present invention relates to optical mode conversion in an optical fiber.

A conventional optical fiber comprises an optical core that has the function of transmitting, and where applicable amplifying, an optical signal, and it is surrounded by optical cladding that has the function of confining the optical signal in the core. To this end, the refractive index $n_1$ of the core is greater than the refractive index $n_2$ of the cladding.

The shape of the graph plotting the refractive index of an optical fiber as a function of the radius of the fiber is generally referred to as the index profile. By convention, the distance r to the centre of the fiber is plotted along the abscissa axis and the difference between the refractive index of the core and the refractive index of the cladding of the fiber is plotted up the ordinate axis. The expressions "step", "trapezium", and "triangle" are used in respect of graphs that have stepped, trapezoidal, and triangular shapes, respectively. These curves generally represent a theoretical or set point profile for the fiber, and fiber fabrication constraints may lead to a profile that is significantly different.

An optical signal transmitted in an optical fiber may be a single mode signal or a multimode signal, depending on the size of the core and the nature of the light waveguide. The propagation mode(s) transmitted in an optical fiber have specific transverse intensity distributions. A longitudinal direction is defined as the axis of optical propagation of the signal in the fiber and a cross section is defined as a plane perpendicular to the longitudinal axis of the fiber.

In new high bit rate wavelength division multiplex (WDM) transmission networks it is advantageous to manage chromatic dispersion, especially for bit rates equal to or greater than 40 Gbit/s or 160 Gbit/s. The object is to obtain cumulative chromatic dispersion over the connection that is substantially zero for all of the wavelength values of the multiplex, in order to limit spreading of the pulses. The expression "cumulative chromatic dispersion" refers to the integral of the chromatic dispersion over the length of the fiber; at constant chromatic dispersion, the cumulative chromatic dispersion is equal to the product of the chromatic dispersion multiplied by the length of the fiber. It is also beneficial to limit the cumulative chromatic dispersion slope over the wavelength range of the multiplex in order to prevent or to limit distortion between the channels of the multiplex. By convention, this slope is the derivative of chromatic dispersion with respect to wavelength.

Single mode fibers (SMF) and non-zero dispersion shifted fibers (NZ-DSF$^+$) are used as the line fiber in conventional optical fiber transmission systems. Those fibers have positive chromatic dispersion and a positive chromatic dispersion slope. It is known in the art to use short lengths of dispersion compensating fiber (DCF) to compensate the chromatic dispersion and the chromatic dispersion slope in single mode fibers or NZ-DSF$^+$ fibers used as line fibers.

Generally speaking, optical transmission systems use line fibers constituted by single mode fibers in which only the fundamental LP01 mode is guided. Nevertheless, the properties of higher order modes can be exploited for certain optical purposes, for example for flattening gain or for compensating chromatic dispersion. It is then necessary to convert the fundamental mode into a spatial mode of higher order. For example, higher order mode (HOM) fibers have high negative chromatic dispersion and large effective area.

There are two main optical mode conversion methods. A first method, called the longitudinal method, introduces a periodical disturbance along the axis of a fiber portion over a given signal propagation distance z. Such a disturbance, for example a long period grating (LPG), leads to coupling between the fundamental mode and a higher order mode. However, that method cannot achieve 100% mode coupling. Although attenuated, the fundamental mode continues to be guided in the HOM fiber and generates noise in a signal propagating in a higher order mode in the HOM fiber.

The second method, called the transverse method, modifies the transverse intensity distribution of the signal at a given point along the propagation of the signal by means of a delay element adapted to introduce controlled phase jumps. A technique of that kind can theoretically provide coupling of 100% between a first mode and a second mode, providing the phase shifting elements are perfectly aligned with the signal propagation axis.

Thus international patent application WO 99/49342 proposes to effect transverse optical mode conversion by inserting phase selection elements between two light waveguides, which phase selection elements can comprise diffractive or reflective elements, such as lenses, mirrors, gratings, electro-optical components, etc. However, a mode converter of that kind is complex, inflexible, and relatively bulky. Moreover, a free space converter of that kind is sensitive to the environment, and it is therefore difficult to operate in the long-term and to adjust.

European patent application EP 1 343 031 discloses an in-fiber transverse mode converter, i.e. a transverse mode converter that is implemented entirely within a fiber. A converter of that kind comprises a light waveguide including a photosensitive region inducing a specific index profile along a section of the guide, which profile simultaneously defines a longitudinal adiabatic transition and a transverse guided mode distribution. It is therefore possible to modify the refractive index of the waveguide locally by controlled irradiation of the photosensitive region of the waveguide. The radial variation of the index profile effects mode conversion and precise control of the irradiation along the waveguide ensures in particular an adiabatic longitudinal transition of the radial variation. However, that kind of control is difficult, and doping the fiber to obtain that particular photosensitive profile is complicated.

The invention aims to mitigate the drawbacks of the prior art. It proposes a simplified mode converter that achieves transverse conversion more efficiently.

The invention thus provides an in-fiber mode converter comprising:
  fiber portions constituting an input microlens adapted to expand the wavefront of said optical signals,
  a fiber portion constituting a phase shifting region adapted to convert said propagation mode of said optical signal into another propagation mode, and
  fiber portions constituting an output microlens.

According to a feature, the fiber portions constituting an input microlens are spliced and the fiber portions constituting an output microlens are spliced.

According to a feature, the fiber portion constituting the phase shifting region has a predetermined length, a predetermined refractive index profile, and a predetermined core diameter.

According to a feature, the index profile of the fiber portion constituting the phase shifting region comprises one or more jumps.

According to a feature, the length of the fiber portion constituting the phase shifting region is from 25 micrometers (μm) to 1000 μm.

According to a feature, the core diameter of the portion constituting the phase shifting region is from 0.5 µm to 100 µm.

Thus the invention relates to an optical system comprising:
a first optical fiber adapted to transmit an optical signal propagating in a first propagation mode,
a mode converter of the invention adapted to convert said first propagation mode into a second propagation mode, and
a second optical fiber adapted to transmit an optical signal propagating in said second propagation mode.

According to a feature, the first and second propagation modes are circularly symmetrical modes LP0$m$.

According to a feature, one of the optical fibers is a multimode fiber.

According to a feature, one of the optical fibers is a higher order mode fiber.

In an application, one of the optical fibers is a chromatic dispersion compensating fiber.

In an application, one of the optical fibers is a Bragg grating component fiber.

In an application, one of the optical fibers is an amplifying fiber.

In an application, the amplifying fiber is a laser emission fiber.

In an application, the amplifying fiber is a Raman amplification fiber.

According to a feature, the optical system further comprises a second mode converter of the invention adapted to convert said second transmission mode into said first transmission mode.

The features and advantages of the invention emerge more clearly on reading the following description, which is given by way of illustrative and non-limiting example and with reference to the appended drawings, in which:

FIG. 1 is a diagram of an optical transmission system including mode converters of the invention, FIG. 2 is a diagram of a mode converter of the invention, FIG. 3 shows an input microlens of the converter of the invention, FIG. 4 is a simulated curve of the angular distribution of the far field intensity for propagation modes LP01 and LP02 respectively in a single mode fiber and in an HOM fiber, FIG. 5 shows an arrangement in the Fourier plane equivalent to the converter of the invention, and FIG. 6 is a diagram showing the aperture ratio of the mode converter of the invention.

The mode converter of the invention comprises spliced fiber portions. The first two portions constitute an input microlens adapted to cause an input optical signal to diverge and to collimate it. The next portion constitutes a phase shifting region adapted to introduce an appropriate phase shift to modify the transverse distribution of intensity in order to convert the propagation mode of the input signal into another propagation mode. The next two portions constitute an output microlens adapted to focus the output signal into an appropriate guide.

Since the fiber portions are spliced together, the converter is compact and losses are minimized compared with a free space solution.

FIG. 1 is a diagram of an optical transmission system including a mode converter of the invention. An optical signal, which may be a WDM signal, is transmitted in a transmission fiber, which is generally a single mode fiber, for example. In this case the optical signal is transmitted in fundamental LP01 mode.

As explained above, it is generally necessary to compensate chromatic dispersion on single mode fiber transmission lines. Such compensation can be made more efficient by using a higher order mode compensation fiber, i.e. if the chromatic dispersion of the signal is compensated in a higher order propagation mode, for example in LP02 mode.

A certain length of higher order mode compensating fiber is therefore inserted into the transmission line between two mode converters respectively adapted to convert LP01 mode into a higher order mode accepted by the HOM fiber, and to convert the higher order mode into LP01 mode, that is re-injected into a single mode fiber in which chromatic dispersion is compensated.

As stated above, mode conversion must be efficient, in other words the overlap with the converted mode must be as close as possible to 100%, in order to limit the noise induced in the HOM fiber, which may limit its chromatic dispersion compensation efficiency. Moreover, this double conversion must minimize the optical power losses of the signal.

FIG. 2 is a diagram of the mode converter of the invention. This in-fiber type of converter is entirely implemented within a fiber, which strongly limits the optical power losses of the signal.

The converter comprises fiber portions 10 constituting an input microlens, a fiber portion 20 constituting a phase shifting region, and fiber portions 30 constituting an output microlens. The microlenses 10 and 30 are described in more detail later with reference to FIG. 3. The phase shifting region is a fiber portion 20 having an index profile, a core diameter e and a length L that are all predetermined. The expression "phase shifting" means introducing at least one phase jump of specific value at a given spatial position of the field.

Accordingly, the wavefront of an optical signal guided in a fiber 40 in a given first propagation mode is expanded by the input microlens 10. The optical signal propagating in the phase shifting region 20 is therefore no longer guided and may be subjected to phase shifts that lead to optical mode conversion. The wavefront of the converted mode is then focused by an output microlens 30 to match the numerical aperture of the output fiber 50. An optical signal propagating in a second given propagation mode may then be guided in the output fiber 50.

For example, a signal propagating in LP01 mode in a single mode transmission fiber 40 is presented to the input of the converter. The wavefront of LP01 mode is expanded and collimated by the input microlens 10. The wave propagating in the phase shifting portion 20 is not guided, even though this portion has a core and optical cladding that could serve as a waveguide. The input microlens 10 has expanded the field of the incoming mode beyond the numerical aperture of the fiber portion 20. The phase shifting region 20 therefore introduces appropriate phase jumps, as described below, for example to convert LP01 mode to LP02 mode. However, LP02 mode is no longer guided in the phase shifting region 20 and has a mode diameter much greater than the numerical aperture of the HOM fiber 50. The output microlens 30 then focuses the LP02 mode propagation to match the aperture of the HOM fiber.

It must be understood that the same routing of the optical signal applies to the opposite conversion; an HOM fiber 40 introduces a higher order propagation mode signal, for example an LP02 mode signal, into the input microlens 10. The LP02 mode signal is then converted into LP01 mode in the phase shifting region 20. The LP01 mode signal is then focused by the output microlens 30 onto a single mode fiber 50.

FIG. 3 shows an input microlens 10 of the mode converter of the invention. This figure also shows (shaded) the expansion of the optical mode by the microlens.

The theory and properties of microlenses are described in "Design and Performance of Expanded Mode Fiber Using Microoptics" by P. Chanciou et al. A microlens consists of a fiber portion comprising a pure silica region 11 which behaves like a divergent lens welded to a graded index region 12 which behaves like a convergent lens. A component of this kind is available from Optogone.

One function of an input microlens is to cause the wavefront of the incoming optical signal to diverge. The pure silica portion has no optical core and the optical mode of the incoming signal is no longer guided in this portion. Another function of the input microlens is to use the graded index region to collimate the divergent beam.

The function of an output microlens is to cause the wavefront of the output signal of the phase shifting portion to converge and to focus it onto a fiber, maximizing the overlap between the converted mode and the selected propagation mode in the output fiber.

A microlens therefore has two bidirectional functions and behaves like a double optical lens.

Accordingly, an input signal guided in a fiber is caused to diverge by the divergent lens consisting of the pure silica region of the input microlens. The divergent beam is then collimated by the convergent lens consisting of the graded index region of the input microlens.

Similarly, an unguided but collimated optical beam may be caused to converge by a first lens consisting of the graded index region of the output microlens. The beam is then collimated by a second lens consisting of the pure silica region of the output microlens in order to be introduced into a fiber with an appropriate mode field diameter.

The length $L_S$ of the pure silica region and the length $L_{GRIN}$ of the graded index region are selected as a function of the input and output mode field diameters, i.e. as a function of the core diameters of the fibers at the input and at the output of the microlenses. These lengths $L_S$ and $L_{GRIN}$ determine the focal lengths of the equivalent lenses described above.

Accordingly, from a guided and confined input signal, for example a single mode signal propagating in LP01 mode in a single mode fiber with a mode field diameter of 9 µm, a microlens can supply an expanded collimated signal with a diameter from 5 µm to 80 µm.

Microlenses are used to convert the propagation mode of an expanded signal propagating in the form of parallel beams in the phase shifting region 20. The phase shifting region therefore behaves like a phase plate introducing spatially appropriate phase jumps.

The fiber portion constituting the phase shifting region has a stepped refractive index profile that may be rectangular, step-shaped, or of any other shape adapted to produce a phase shift of more complex shape. Accordingly, depending on the index profile, it is possible to introduce one or more phase jumps of different values at different places in the signal propagation mode field.

For example, a phase jump of $\pi$ can be introduced into the phase of the propagation mode of an optical signal propagating in the above kind of fiber satisfying the following equation, in which $\lambda$ is the wavelength of the optical signal, L is the length of the phase shifting portion and $\Delta n$ is the index jump of the phase shifting portion:

$$\lambda/2 = (\Delta n)L$$

For example, for a 1550 nanometers (nm) transmitted optical signal and a fiber portion with an index jump of $10^{-2}$, the length of the phase shifting region must be 77.5 µm. Depending on the profile of the fiber used for the phase shifting region, the length L of the fiber may be from 25 µm to 1000 µm.

The position of the phase jump to be introduced is determined by the radial position of the index jump of the fiber portion constituting the phase shifting region. If a single phase jump is to be introduced, for example, to convert LP01 mode into LP02 mode, a fiber with a rectangular index profile with an appropriate core diameter e may be used.

Thus FIG. 4 shows the intensity of the far field as a function of the angle $\theta$ for various propagation modes in single mode fibers or HOM fibers.

The transfer function between LP01 mode and the required mode, which is LP02 mode in the present example, determines an angle $\theta_1$ at which it is necessary to introduce a phase jump of $\pi$, for example, to cause the far field to correspond to LP02 mode. In the FIG. 4 example, this angle $\theta_1$ is 5.68°. Other phase jump profiles may be envisaged to achieve mode conversion with an enhanced overlap. FIG. 5 shows an optical arrangement equivalent to the mode converter of the invention. A transmitter 4 corresponds to a fiber 40 transmitting an input optical signal propagating in a first mode. A lens 1 of focal length f corresponds to the input microlens, a phase plate 2 corresponds to the phase shifting region 20, and a lens 3 of focal length f' corresponds to the output microlens. The phase plate 2 has a central region of diameter e with a refractive index jump relative to the surrounding region, which corresponds to the core of the fiber 20. The diameter e of this region determines the angular position of the phase jump to be introduced.

Thus the diameter e of the core of the fiber constituting the phase shifting region is linked to the focal lengths f and f' of the first and second microlenses. This expansion of the incoming mode in the converter must be controlled so that the phase jump introduced by the index jump is correctly positioned relative to the angular distribution of the incoming mode.

FIG. 6 shows the aperture ratio of the mode converter of the invention. The phase plate is in the Fourier space, the input fiber (for example a single mode fiber) is at the point A and the output fiber (for example an HOM fiber) is at the point B'. The respective half-angles $\theta$ and $\theta'$ at which the phase plate is seen by the fibers at the points A and B' are determined. The mode coupling efficiency is maximized if the focal lengths of the two microlenses 10 and 30 are optimized.

The ratio $\alpha = \sin(\theta)/\sin(\theta')$ is then defined. Maximum coupling is observed when $\alpha$ is a linear function of $\theta$. By varying the parameter $\alpha$ as a function of the efficiency of coupling between LP01 and LP02 modes for a fiber corresponding to the FIG. 4 field profiles, the equation $\alpha = a\theta + b$, with $a=0.13$ and $b=0.09$ has been established.

Coupling LP01 mode of a 1550 nm optical signal to LP02 mode with a converter of the invention has been simulated. The angles $\theta'$ and $\theta_1$ were both set to approximately 5.68°, which gave $\theta=2°$. A 775 µm portion of fiber with a rectangular index profile and an index jump of $10^{-3}$ was used for the phase shifting region. The diameter e of the core of the fiber constituting the phase shifting portion was a function of the focal length f' of the output microlens 30 defined by the equation $e = 2f'*\tan\theta'$.

It was calculated that 84% of the power of the LP01 mode signal in the single mode fiber was coupled into the HOM fiber.

It must be understood that the parameters of the fiber portions constituting the mode converter of the invention must be determined in accordance with the required application. Thus the converter of the invention for converting LP01 mode into LP02 mode for a chromatic dispersion compensation application in an HOM fiber will not have the input and output microlenses with the same parameters ($L_S$ and $L_{GRIN}$) or the same index jump profile of the phase shifting region fiber as a converter of the same type intended to convert from LP02 mode to LP01 mode at the output of an HOM fiber or to convert from LP01 mode to LP03 mode, or to effect any other mode conversion that may be required.

Conversion to LP03 mode may be required for an application to higher order mode pumping or to chromatic dispersion compensation in LP03 mode, for example.

In particular, the fiber portion constituting the phase shifting region may have a stepped refractive index profile or any other profile adapted to introduce an appropriate shift in the phase of the propagation mode to be converted.

The mode converter of the invention has circular symmetry. It is consequently adapted to effect mode conversion on any circularly symmetrical mode LP0$m$ whatsoever.

The person skilled in the art will be able, given the information provided herein by way of example, to determine parameters of the input and output microlenses and the index profile of the fiber to be used for the phase shifting region. Certain parameters may be fixed by commercial constraints, such as the commercial availability of a particular microlens with a particular focal length or by the use of fiber portions with a fixed core diameter e and a fixed index jump $\Delta n$.

FIG. 1 is described above with reference to an example of using the mode converter of the invention in an application to chromatic dispersion compensation using an HOM fiber. However, other applications may be envisaged, for example gain flattening in a higher order mode by means of a slant Bragg grating.

The mode converter of the invention may equally be used for an application to pumping in amplifying fibers or laser emission fibers with good amplification efficiencies.

The invention claimed is:

1. An in-fiber mode converter for converting the propagation mode of a received optical signal, said converter comprising:
    first fiber portions constituting an input micro lens configured to expand the wavefront of said optical signals;
    a second fiber portion constituting a phase shifting region configured to convert said propagation mode of said optical signal into another propagation mode within said second fiber portion; and
    third fiber portions constituting an output microlens configured to transmit said optical signal in said other propagation mode.

2. The in-fiber mode converter according to claim 1, wherein said fiber portions constituting an input microlens are spliced and said fiber portions constituting an output microlens are spliced.

3. The in-fiber mode converter according to claim 1, wherein the fiber portion constituting the phase shifting region has a length, a refractive index profile and a core diameter.

4. The in-fiber mode converter according to claim 1, wherein the index profile of said fiber portion constituting the phase shifting region includes one or more jumps.

5. The in-fiber mode converter according to claim 1, wherein the length of said fiber portion constituting the phase shifting region is from 25 µm to 1000 µm.

6. The in-fiber mode converter according to claim 1, wherein the core diameter (e) of said fiber portion constituting the phase shifting region is from 0.5 µm to 100 µm.

7. An optical system comprising:
    a first optical fiber configured to transmit an optical signal propagating in a first propagation mode;
    a mode converter according to claim 1 configured to convert said first propagation mode into a second propagation mode; and
    a second optical fiber configured to transmit an optical signal propagating in said second propagation mode.

8. The optical system according to claim 7, wherein the first and second propagation modes are different circularly symmetrical modes LP0$m$.

9. The optical system according to claim 7, wherein one of the optical fibers is a multimode fiber.

10. The optical system according to claim 7, wherein one of the optical fibers is a higher order mode fiber.

11. The optical system according to claim 7, wherein one of the optical fibers is a chromatic dispersion compensating fiber.

12. The optical system according to claim 7, wherein one of the optical fibers is a Bragg grating component fiber.

13. The optical system according to claim 7, wherein one of the optical fibers is an amplifying fiber.

14. The optical system according to claim 13, wherein the amplifying fiber is a laser emission fiber.

15. The optical system according to claim 13, wherein the amplifying fiber is a Raman amplification fiber.

16. The optical system according to claim 7, further comprising:
    a second mode converter configured to convert said second transmission mode into said first transmission mode, said second mode converter including fiber portions constituting an input microlens configured to expand the wavefront of said optical signals;
    a fiber portion constituting a phase shifting region configured to convert said propagation mode of said optical signal into another propagation mode; and
    fiber portions constituting an output microlens configured to transmit said optical signal in said other propagation mode.

* * * * *